(No Model.) 4 Sheets—Sheet 1.
C. P. STANFORD.
DEVICE FOR OPERATING HATCHWAY DOORS.
No. 368,432. Patented Aug. 16, 1887.
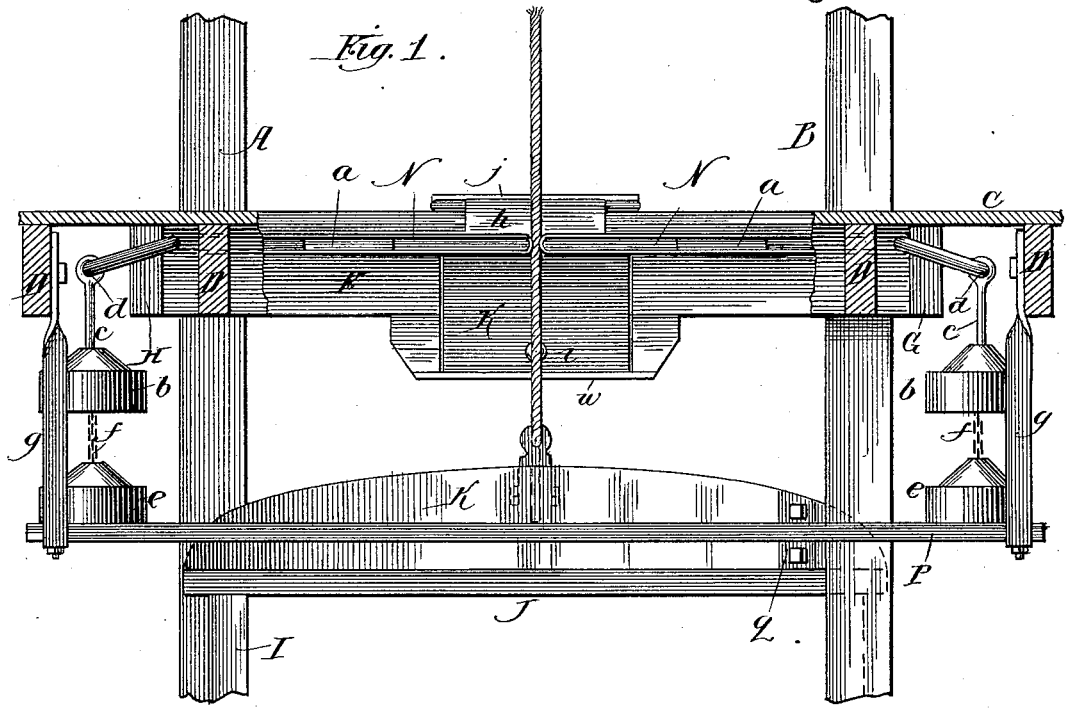
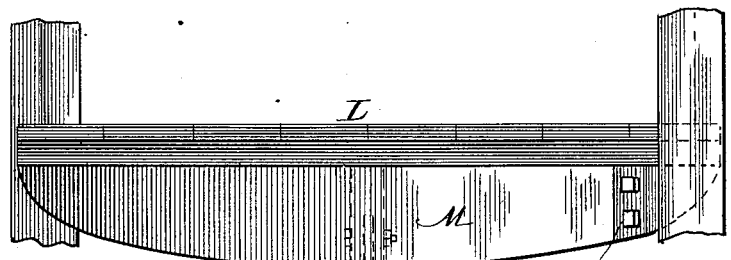
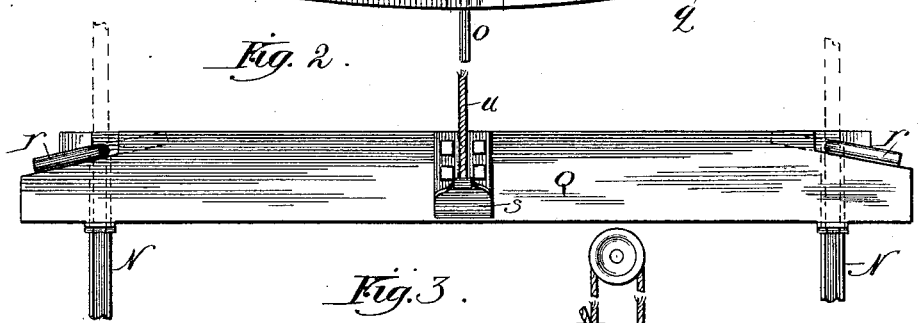
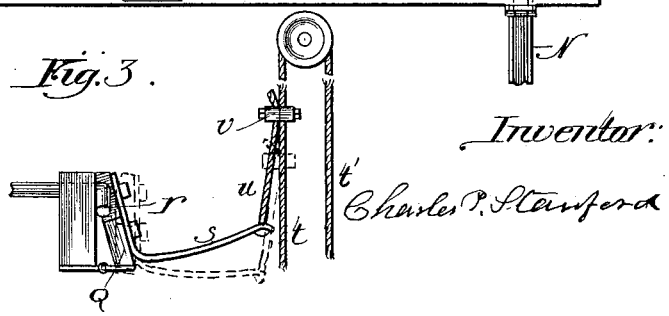
Witnesses:
O. W. Bond
Harry T. Jones
Inventor:
Charles P. Stanford (No Model.) 4 Sheets—Sheet 2.
C. P. STANFORD.
DEVICE FOR OPERATING HATCHWAY DOORS.
No. 368,432. Patented Aug. 16, 1887.
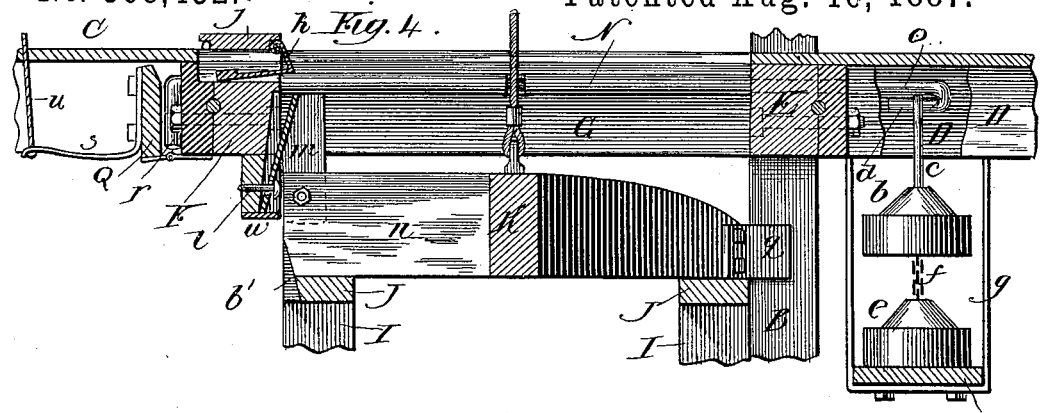
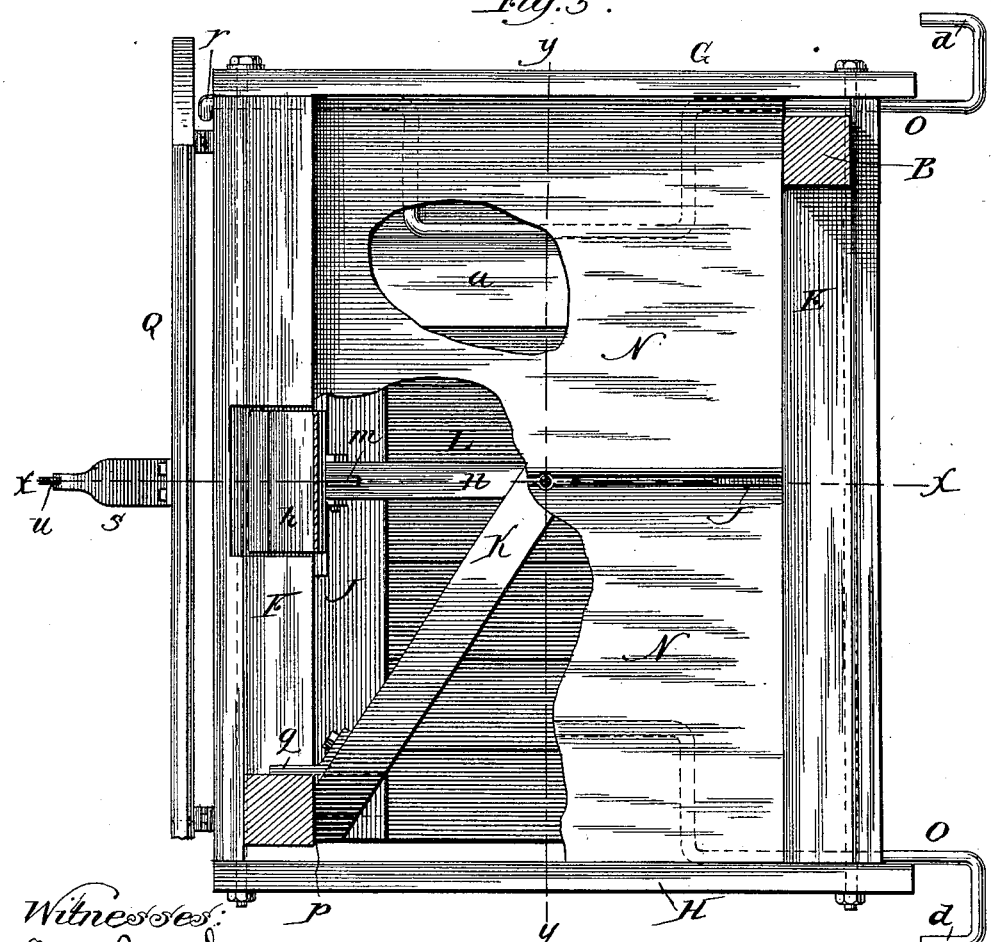
Witnesses:
Inventor:
Charles P. Stanford

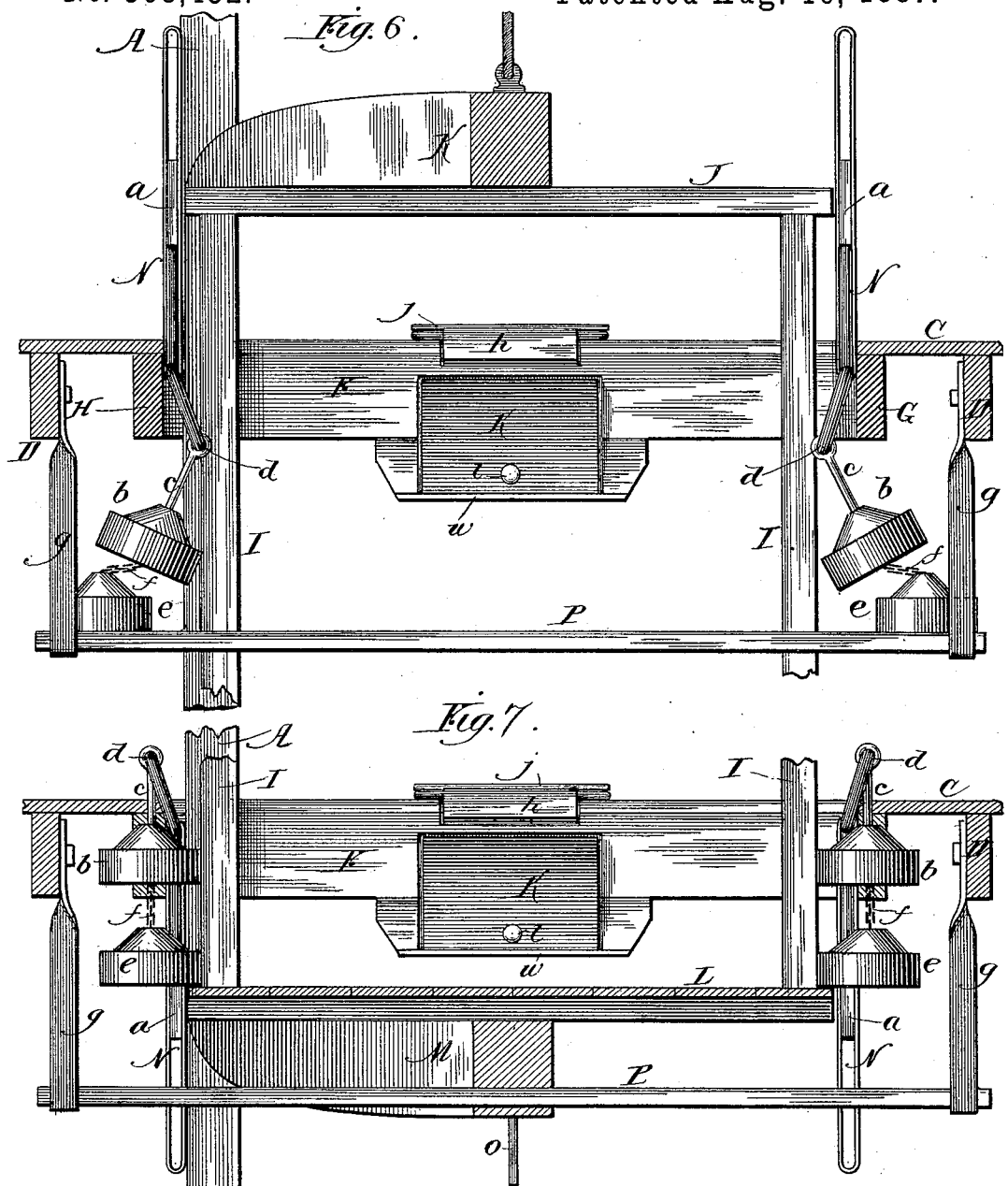

(No Model.) 4 Sheets—Sheet 4.
C. P. STANFORD.
DEVICE FOR OPERATING HATCHWAY DOORS.
No. 368,432. Patented Aug. 16, 1887.
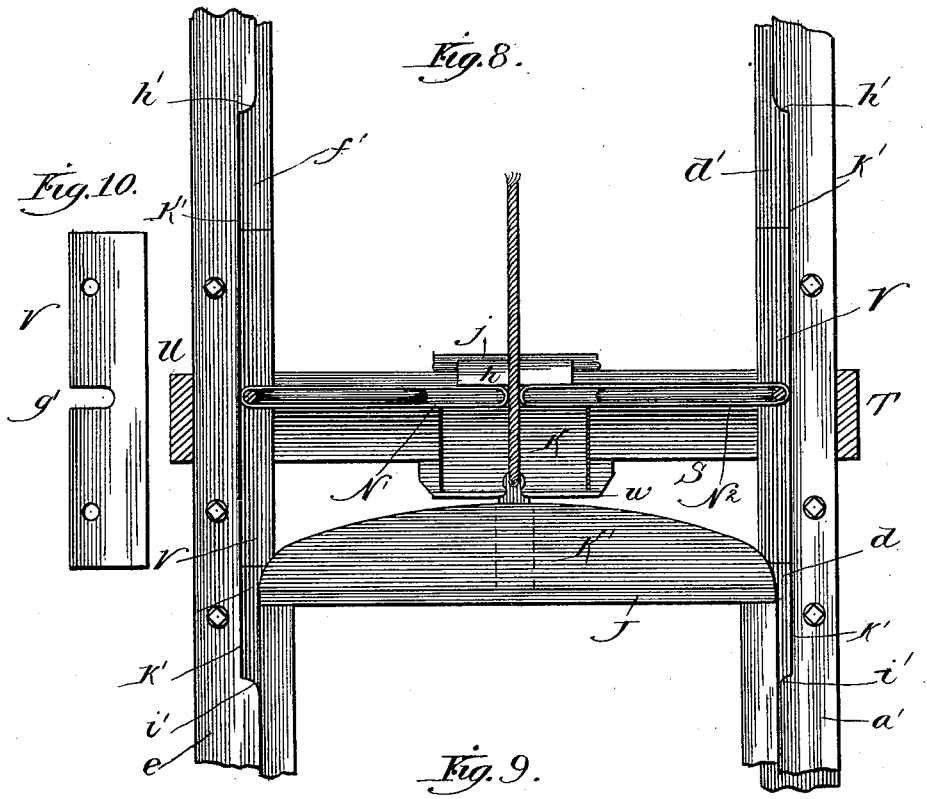
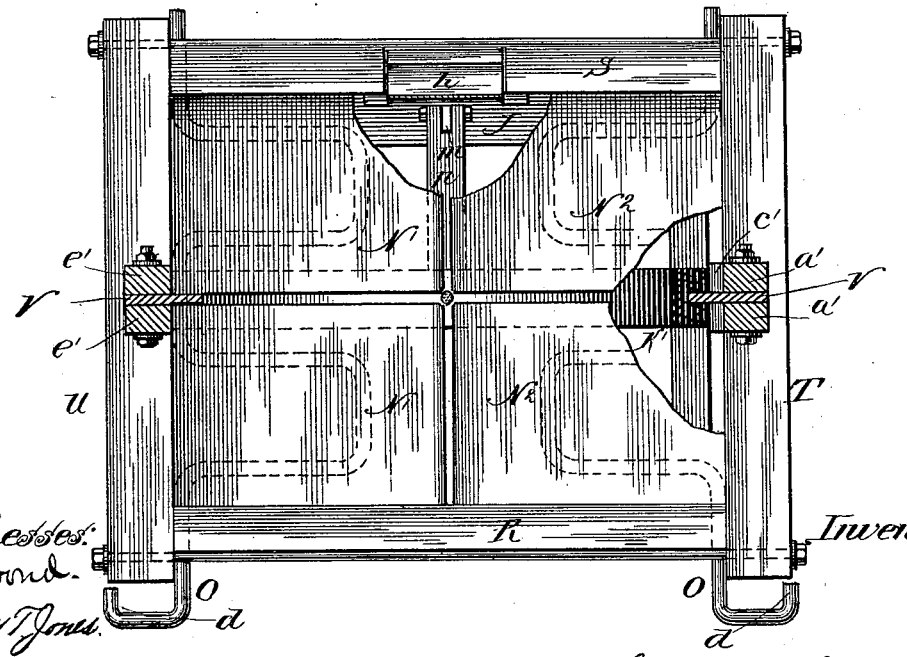

UNITED STATES PATENT OFFICE.

CHARLES P. STANFORD, OF SAN FRANCISCO, CALIFORNIA.

DEVICE FOR OPERATING HATCHWAY-DOORS.

SPECIFICATION forming part of Letters Patent No. 368,432, dated August 16, 1887.

Application filed March 30, 1887. Serial No. 233,006. (No model.)

*To all whom it may concern:*

Be it known that I, CHARLES P. STANFORD, residing at San Francisco, in the county of San Francisco and State of California, and a citizen of the United States, have invented a new and useful Improvement in Devices for Operating Hatchway-Doors, of which the following is a specification, reference being had to the accompanying drawings, in which—

Figure 1 is a front elevation showing an elevator-cage and one floor with doors for the hatchway, devices for holding the same closed, and operating-weights, some parts being in section. Fig. 2 is a side elevation of a device used for holding the doors of the hatchway in an open position. Fig. 3 is an end view of the device shown in Fig. 2, also showing cords for operating the same. Fig. 4 is a vertical section of the upper part of the cage, taken at line x of Fig. 5, looking toward the top of the sheet, some parts being in elevation. Fig. 5 is a top view of the cage and device for holding the hatchway-doors open, portions of the doors which close the hatchway being cut away. Fig. 6 is a vertical section taken at line y y of Fig. 5, looking to the left, showing the upper portion of the cage, the hatchway-doors being opened upward instead of closed, as shown in Fig. 5. In this figure the weights and some other parts are shown in elevation, which would not be seen in the sectional view. Fig. 7 is a view similar to that shown in Fig. 6, except that the doors are opened downward, and the position of the weights is necessarily changed, as well as the position of the cage, and the lower portion of the cage or platform is shown instead of the upper portion. Figs. 8, 9, and 10 show a modification in which the guiding devices are at two opposite sides instead of at two diagonally-opposite corners of the cage, Fig. 8 being an elevation showing the guiding devices, hinged doors, catches, and part of the cage. Fig. 9 is a top view showing a hatchway and hinged doors, parts of the doors being cut away. Fig. 10 is a detail, being a side elevation of that part of the guide-strip which is used at a hatchway.

The chief principle of my invention consists in providing for closing elevator-hatchways by means of hinged doors which are opened both upward and downward by the moving elevator-cage, and which, after having been opened upward, are closed partly by gravity, and which, when having been opened downward, are closed by weights only.

I have illustrated in the drawings and will herein describe the best mode in which I have contemplated applying this principle as well as some auxiliary devices.

Those things which I claim as new will be pointed out in the claims.

In the drawings, A B represent two posts at two diagonally-opposite corners of the elevator-hatchways.

C is a floor; D, floor-joists.

E F are two timbers on opposite sides of the hatchway.

G H are two timbers at the remaining sides of the hatchway, which timbers are bolted to the timbers E F, as indicated in Fig. 5.

I are corner-posts of the elevator-cage, at the tops of which cross-bars J are secured.

K is a diagonal cross-piece secured to the top of the cage, with which the elevator-cable is connected. This piece has its ends rounded on the upper side, as shown in the drawings.

L is the floor of the cage.

M is a diagonal cross-piece secured to the under side of the cage, and it is rounded at the ends, as shown in the drawings.

N are two doors arranged to close the hatchway. These doors are, as shown, to be made of heavy sheet metal, folded over so as to leave a space between the two parts, a portion of which space is filled with strips of wood, a. The two doors N are hinged, one at each of two opposite sides of the hatchway. The hinge for each door consists of a heavy rod of iron, O, which is supported in suitable bearings. Each rod O is bent, as shown partly in full lines and partly in dotted lines in Fig. 5, and is located between the two walls of the door, thereby forming a very strong hinge and support for the same, which is not liable to break or get out of order. These rods O extend upon one side of the hatchway a little distance from the wall thereof, and are bent into the form shown in Figs. 1, 4, and 5. These bent portions are not in the same plane with the doors, but stand at an angle thereto, as shown in Fig. 1, and in use these bent portions in effect perform the office of cranks.

*b* are weights, one of which is suspended, as shown, by means of a rigid connection, *c*, from the end *d* of each one of the rods O.

*e* are other weights, one of which is suspended by a flexible connection, *f*, from the lower side of each weight *b*.

*g* are hangers, each of which is secured at its upper ends to one of the joists D. The upper ends of these hangers are slotted, so that they can be adjusted vertically.

P is a piece of plank supported by the hangers *g*, on which the weights *e* rest a portion of the time.

*h* is a catch. As shown, it is made of a piece of metal bent at nearly right angles, forming two arms, one of which is hinged to the floor and the other of which is provided with a weight, the arm which carries this weight being located in a recess provided for it, as shown in Fig. 4.

*j* is a block over the hinge.

*k* is another catch, the lower end of which is loosely supported on a ledge, *w*. *l* is a screw or bolt, the head of which limits the movement of this catch in one direction. This catch *k* stands at an angle, as shown in Fig. 4. When the doors N are closed, they are between these two catches *h k*, as shown in Fig. 4.

*m* is a projecting piece secured to a cross-bar, *n*, and arranged to pass between the adjoining edges of the doors N, and also to engage with the catches *h k* and press them back out of the way of the doors. The outer edge of this piece *m* is beveled. The bottom of the cage is also provided with downwardly-projecting pieces *o*, corresponding with the pieces *m*, which are also arranged to pass between the edges of the doors and to engage with the catches *h k*. That one of the cross-bars J at the top of the cage and the bar *n*, which might come in contact with the lower catch when the cage is descending, are to be beveled a little, as shown at *b'*, Fig. 4, and a similar bevel is to be made on the edge of the floor of the cage, so that it will pass the catches when the cage ascends. The opposite ends of the piece K are beveled, as shown at *p*, Fig. 5, the bevels being arranged to slide on the posts A B.

*q* are angle-irons bolted to the piece K, one near each end, which irons are also arranged to slide on the posts A B. These beveled edges and the angle-irons form guides for the cage in its movement up and down. Similar guides are provided at the bottom of the cage.

It may at times be desirable to hold the hatchway-doors open while the cage is ascending and descending. I have provided a device by means of which this can be done, which is as follows:

Q is a bar, the ends of which are beveled. This bar is hinged at one side of the hatchway, as shown in Figs. 3, 4, and 5, so that it can stand in a vertical position, as shown in Figs. 4 and 5, or in an inclined position, as shown in Fig. 3.

*r* are projecting ends of the rods O, so bent as to stand at about right angles with the doors N. These ends *r* are located between the timber F and the bar Q.

*s* is a spring-arm secured to the outside of the bar Q.

*t t'* is a cord which passes over a pulley at the top of the elevator-shaft, both ends of which extend down to the lower floor.

*u* is a short cord, one end of which is secured to the spring-arm *s*. The other end is attached to the rope *t* by means of a clamp, *v*.

The operation is as follows: Suppose the doors of the hatchways to be closed, as shown in Figs. 1 and 4. Then, as the cage or platform ascends, the piece *m* will pass up between the adjoining edges of the two doors, and will push back both of the catches *k h*, and when the cross-piece K comes in contact with the under side of the doors the doors will be lifted and carried up into a vertical position, as shown in Fig. 6, and the weights *b*, which partially counterbalance the doors, will come into the position shown in Fig. 6, the weights *e* resting on the plank P and being out of action. This will be the operation at each hatchway as the cage ascends. When the doors are opened upward, as last above described, the bent ends of the rods O, upon which the weights are suspended, do not stand in line with the doors, but are a little inclined thereto and toward the center of the hatchway, as shown in Fig. 6, and when the ascending cage leaves the hatchway the weights which are suspended on the ends *d* of the hinge-rods O will cause the upper ends of the doors to move a little toward the center of the hatchway, and then these doors will fall by gravity, the weights *b* preventing them from falling with too much force, and the doors will again come into the position shown in Figs. 1 and 4, and will be held there by the catches *h k*. When the platform descends, the piece *o* at the bottom of the cage will push back the catches, and the bar M, coming in contact with the doors, will push them downward into the position shown in Fig. 7, and both weights will at the same time be raised, as shown in this figure. Then the bent portions of the hinge-rods O, from which the weights are suspended, will not stand in a vertical line with the doors, but will stand at an angle thereto, the inclination being from instead of toward the center of the hatchway, as shown in Fig. 7, and when the top of the cage leaves the hatchway and doors the action of the weights will return the doors to the position shown in Fig. 1. The angular position of these bent portions of the rods O relatively to the planes of the doors, as shown in Fig. 7, overcomes the resistance of the doors, and this advantage is maintained until the doors are closed. I have shown two weights for each door; but it is evident that a single weight might be successfully used with each door, because of the angularity of the bent portions of the rods O, which carry the weights, relatively to the planes of the doors and the changing position of such bent portions in use. When only a single weight is used with each door, such single weight must very nearly counterbalance the door when closed, and hence when a single weight is used its weight must be more carefully adjusted than when two weights are used. The catches $h$ $k$, after they have been pushed back, return to the position shown in Fig. 4 automatically. I have shown these catches only on one side of the hatchway, but if desired similar catches may be placed on the opposite side.

The operator can, if he desires, fasten the hatchway-doors so that they will be opened downward and will remain open until the holding devices be released while the cage or platform ascends and descends. This can be done as follows: The operator must first fasten the two ends of the cord $t$ $t'$ so that the cord will be taut upon both sides. Then he must adjust the cord $u$ upon the cord $t$ by means of the clamp $v$ so that there will be some tension on the spring $s$, tending to carry the bar Q into the position shown in Fig. 3. This must be done at each of the hatchways. Then the two ends of the cord $t$ $t'$ must be released, when the bar Q will assume or be in the position shown in Figs. 4 and 5. So long as these parts remain in this position the doors will open and close, as before described. If, now, it be desired to leave the doors open for a time, the operator must pull down on the cord $t'$, bringing the spring $s$ under some tension and fasten the cord in that position, the bar Q at this time being in contact with and pressing against the arms $r$ on the rods O. Then, when the doors are opened downward, these arms $r$ will be brought into the position shown in Figs. 2 and 3, and the tension of the spring $s$ on the bar Q will force it under the arms $r$, as shown in Figs. 2 and 3, and so long as the bar remains in this position the hatchway-doors will remain open. Whenever the cord $t'$ is released the bar Q will be again brought into the position shown in Figs. 2 and 4, and then the doors will be closed by the action of the weights.

I do not confine myself to weights located and arranged exactly as shown and described, it being evident that two weights, operating substantially as described, may be located and arranged in a different manner without departing from the spirit of my invention.

It will sometimes be desired to place the guiding devices for the cage at opposite sides of the hatchway instead of at opposite corners. I have shown in Figs. 8, 9, and 10 how this can be accomplished. In these figures those parts which require description are as follows:

R S are two timbers corresponding with the timbers E F, before described.

T U are two other timbers corresponding with the pieces G H, except that the former are heavier than the latter.

$a'$ $a'$ are two small timbers or strips of wood which extend from the lower floor as far up as the cage moves. They are let into the timbers T at the several hatchways and project a little beyond the inner sides of each timber T, as shown in Fig. 9; but at each hatchway these timbers are cut away a short distance above and below the horizontal line of the doors, so as to form recesses and not interfere with the opening of the hatchway-doors, as shown by lines $h'$, Fig. 8, and also indicated at $c'$, Fig. 9. As shown, each post is cut away from the point $h'$ down to the point $i'$.

$d'$ is a piece of metal bolted between the two pieces $a'$ $a'$, which strip of metal projects into the hatchway beyond the timbers $a'$.

$e'$ $e'$ are two other timbers on the opposite side of the hatchways, corresponding with those just described.

$f'$ is a strip of metal bolted between the two pieces $e'$. The cage is provided on each of two opposite sides with a vertical post provided with a long vertical groove extending from top to bottom, which receives the guide-irons $d'$ $f'$. When the guides are arranged as shown in Figs. 8 and 9, it becomes necessary to make four doors, N′ N″, (shown in Fig. 9,) instead of two, as before described. Otherwise the guide-strips $d'$ $f'$ would interfere with the opening of the doors. The hinge-rods O are each provided with two bends, as indicated by dotted lines in Fig. 9, instead of with a single bend, one of which bends is located between the two walls of each door, substantially as before described. The hinged rods O are continuous. It is desirable, I think, to have the guide-irons $d'$ $f'$ in effect continuous. I therefore provide a short strip, V, at each side of each hatchway, each of which strips has a slot, $g'$, on one side. This piece can be inserted in place between the vertical timbers, the hinged rod O being in the slot $g'$ and the strips V being bolted in place.

The top of the cage is provided with a bar, K′, arranged as shown in the drawings, and adapted to open the four doors upward in substantially the same manner that the bar K in the other figures opens the doors. The lower end of the cage is provided with another bar, similar to K′, which comes in contact with the doors when the cage descends and forces them open downward.

I have not shown the weights in Fig. 9; but they are supposed to be used as previously described.

The operation of this modification is substantially the same as before described.

There is a little space between the two doors N′, and also between the two doors N², the distance being slightly greater than the thickness of the guide-irons $d'$ $f'$, so that when the doors are opened they can pass by the guide-irons and be out of the way of the ascending cage.

The pair of doors N′ are hinged upon a single rod, O, and operated together by one pair of weights. The same is true of the two doors N². When the doors N′ N² are used, I provide catches on both sides of the hatchway, and also provide devices for operating them corresponding with m.

What I claim as new, and desire to secure by Letters Patent, is—

1. In combination with an elevator-hatchway and an elevating cage or platform, hinged doors which open either upward or downward by the action of the moving cage, catches to hold the doors in a closed position, and devices connected with the cage to release the catches, substantially as specified.

2. A door for closing an elevator-hatchway, made of sheet metal with a space between the two opposite sides, in combination with a hinged rod having a bent portion between the two sides of the door, substantially as stated, for the purpose of supporting the door and securely hinging it to the walls of the hatchway, substantially as specified.

3. A door for closing an elevator-hatchway, in combination with a hinge-rod, O, secured to the door and bent at one end, such bent portion standing at an angle to the plane of the door and adapted to receive and hold a weight, substantially as and for the purposes specified.

4. In combination with an elevator-hatchway and an elevating cage or platform, a hinged door which opens either upward or downward by the action of the moving cage, a rod bent at one end and secured to the door, such bent portion standing at an angle with the plane of the door, and a weight or weights suspended on the rod and acting on the door, substantially as and for the purposes specified.

5. In combination with an elevator-hatchway, a hinged bar, Q, beveled at its ends, a spring-arm, $s$, cords $u$ and $t\ t'$, clamp $v$, and hinge-rods O, provided with arms $r$, substantially as and for the purposes specified.

6. In combination with an elevator-hatchway, posts $a'\ e'$, guide-irons $d'\ f'$, hinged doors, hinge-rods O, and strips V, substantially as and for the purposes specified.

CHARLES P. STANFORD.

Witnesses:
  O. W. BOND,
  HARRY T. JONES.